United States Patent [19]

DeJonge et al.

[11] Patent Number: 5,799,538
[45] Date of Patent: Sep. 1, 1998

[54] SHIFTER WITH BOTTOM MOUNTED LEVER

[75] Inventors: Robert A. DeJonge, West Olive; Richard G. Holtzclaw, Grand Haven, both of Mich.

[73] Assignee: Grand Haven Stamped Products Co. Div of JSJ Corporation, Grand Haven, Mich.

[21] Appl. No.: 757,447

[22] Filed: Nov. 27, 1996

Related U.S. Application Data

[63] Continuation of Ser. No. 420,124, Apr. 11, 1995, abandoned.

[51] Int. Cl.$^6$ .......................... B60K 20/04; F16H 59/04
[52] U.S. Cl. .................. 74/473.3; 74/473.28; 74/538
[58] Field of Search ................ 74/475, 538, 473.3, 74/473.28; 192/4 A

[56] References Cited

U.S. PATENT DOCUMENTS

| | | |
|---|---|---|
| 3,601,230 | 8/1971 | Platz . |
| 3,941,008 | 3/1976 | Cambria . |
| 4,304,112 | 12/1981 | Osborn .......................... 74/475 X |
| 4,474,085 | 10/1984 | Devogelaere et al. . |
| 4,541,300 | 9/1985 | Kwiatkowski et al. .......... 74/476 |
| 5,062,509 | 11/1991 | Carpenter et al. ............. 192/4 A |
| 5,078,242 | 1/1992 | Ratke et al. . |
| 5,096,033 | 3/1992 | Osborn ........................ 192/4 A |
| 5,129,494 | 7/1992 | Rolinski et al. .............. 192/4 A |
| 5,186,069 | 2/1993 | Asano et al. ................. 192/4 A |
| 5,197,356 | 3/1993 | Kobayashi et al. . |
| 5,220,984 | 6/1993 | Ruiter ........................ 192/4 A |
| 5,277,077 | 1/1994 | Oaborn ........................... 74/475 |
| 5,277,078 | 1/1994 | Osborn et al. . |
| 5,309,783 | 5/1994 | Doolittle et al. . |
| 5,400,673 | 3/1995 | Brock ............................ 74/475 |
| 5,435,424 | 7/1995 | Murakami et al. ............ 192/4 A |
| 5,445,046 | 8/1995 | Kataumi et al. . |

FOREIGN PATENT DOCUMENTS

WO9316428  8/1993  WIPO .

*Primary Examiner*—Charles A. Marmor
*Assistant Examiner*—Troy Grabow
*Attorney, Agent, or Firm*—Price, Heneveld, Cooper DeWitt & Litton

[57] ABSTRACT

An automatic transmission shifter includes a molded support and a shift lever pivotally mounted to the support by a pivot pin. The support includes a pair of spaced apart pivots forming an axis of rotation for the shift lever, and further includes a detent plate arching over the axis of rotation. The shift lever includes a post and an insert-molded pivot structure at the lower end of the post configured to fit between the spaced apart pivots on the support and to be pivotally mounted to the pivots by the pivot pin. The bottom of the support is open such that the shift lever can be extended through the bottom of the support during assembly to position the pivot structure between the spaced apart pivots with being operably adjacent the detent plate of the support.

19 Claims, 7 Drawing Sheets

SHIFTER WITH BOTTOM MOUNTED LEVER

This is a continuation of application Ser. No. 08/420,124, filed Apr. 11, 1995, now abandoned.

BACKGROUND OF THE INVENTION

The present invention concerns a vehicle shifter, and more particularly concerns an automatic transmission shifter having a shift lever support configured to facilitate assembly.

Many automotive transmission shifters for vehicles include a support having a cup-shaped section forming a recess for pivotally supporting a shift lever. The cup-shaped section forms a structurally rigid mounting structure for the shift lever, and further locates the pivot axis for the shifter at a low position on the shifter to provide optimal mechanical advantage and movement to actuate a transmission shift cable when pivoting the shifter. However, the cup-shaped section also creates a semi-blind situation where it is more difficult than desired to align the shifter with pivot holes on the support when installing a pivot pin to pivotally mount the shift lever to the support. This semi-blind situation can be further aggravated by the presence of other structures on the support, such as the detent plate, brackets for the feel positioner, and other brackets and components related to brake-ignition-transmission-shift-interlock (BITSI) safety systems commonly used on modern vehicle shifters.

Another problem is the numerous pieces that must be welded or assembled together to form a shifter support subassembly or a complete shifter assembly. Some molded support structures have been constructed to reduce the number of parts and subassembly operations. However, improved molded structures are desired that save material and reduce weight, and yet are structurally satisfactorily rigid. Further, many molded support structures also have the semi-blind assembly problem noted above.

Thus, a shifter solving the aforementioned problems is desired.

SUMMARY OF THE INVENTION

The present invention includes an automatic transmission shifter for a vehicle including a support configured for attachment to a vehicle, and a shift lever defining a plurality of gear positions pivotally mounted to the support. The support includes a detent plate structure defining a plurality of gear positions and further includes opposing pivots defining a space therebetween generally below the detent plate structure. The shift lever includes a post and pivot structure at one end of the post. The support includes a bottom defining an access opening to the space, and the shift lever is configured to fit through the access opening of the support during assembly to an operative position wherein the post is positioned adjacent the detent plate structure and the pivot structure is positioned between the opposing pivots. The shifter also includes at least one pivot pin engaging the pivot structure and the opposing pivots for pivotally mounting the shift lever to the support.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
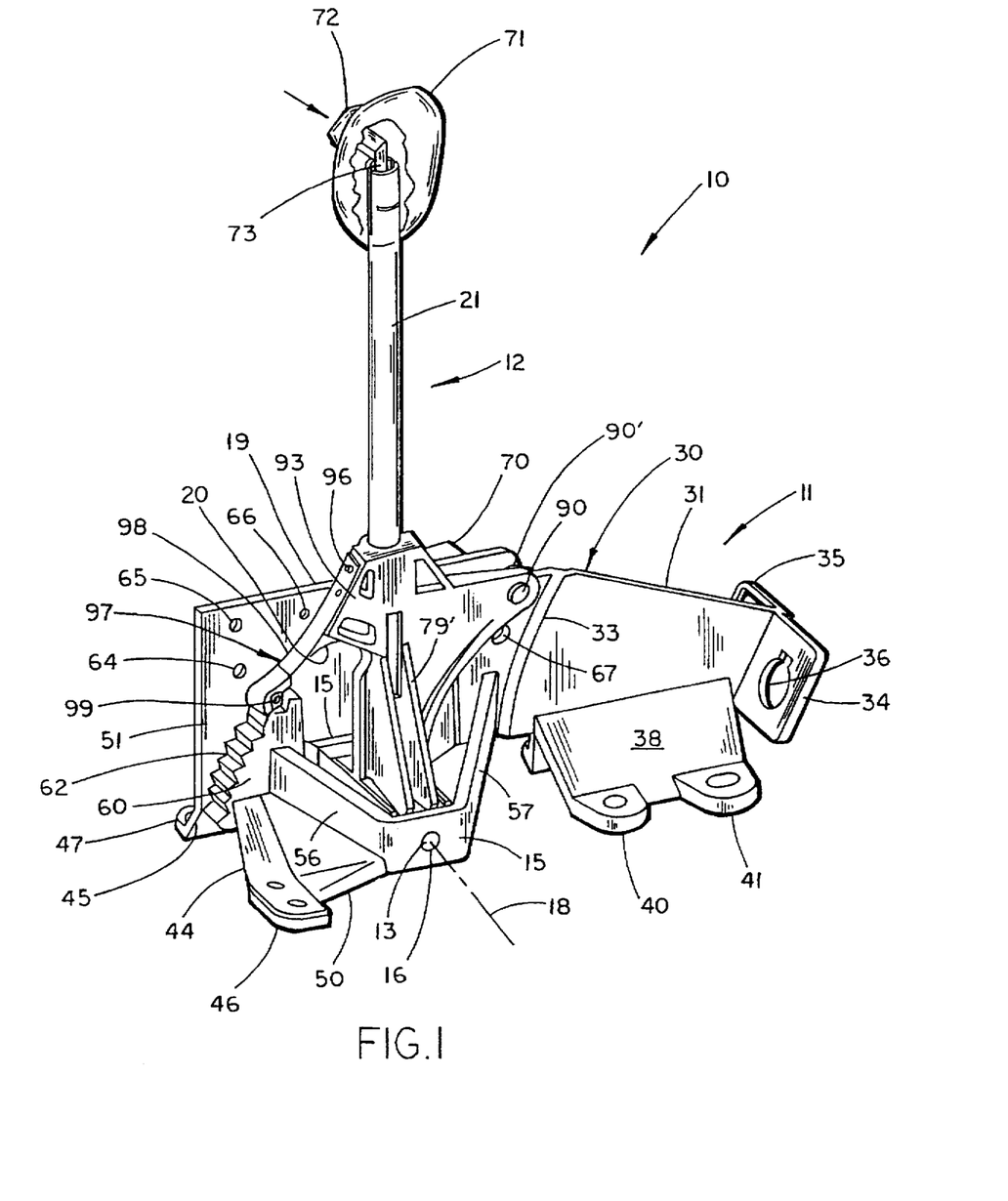
FIG. 1 is a top perspective view of a shifter embodying the present invention.
Figure 2:
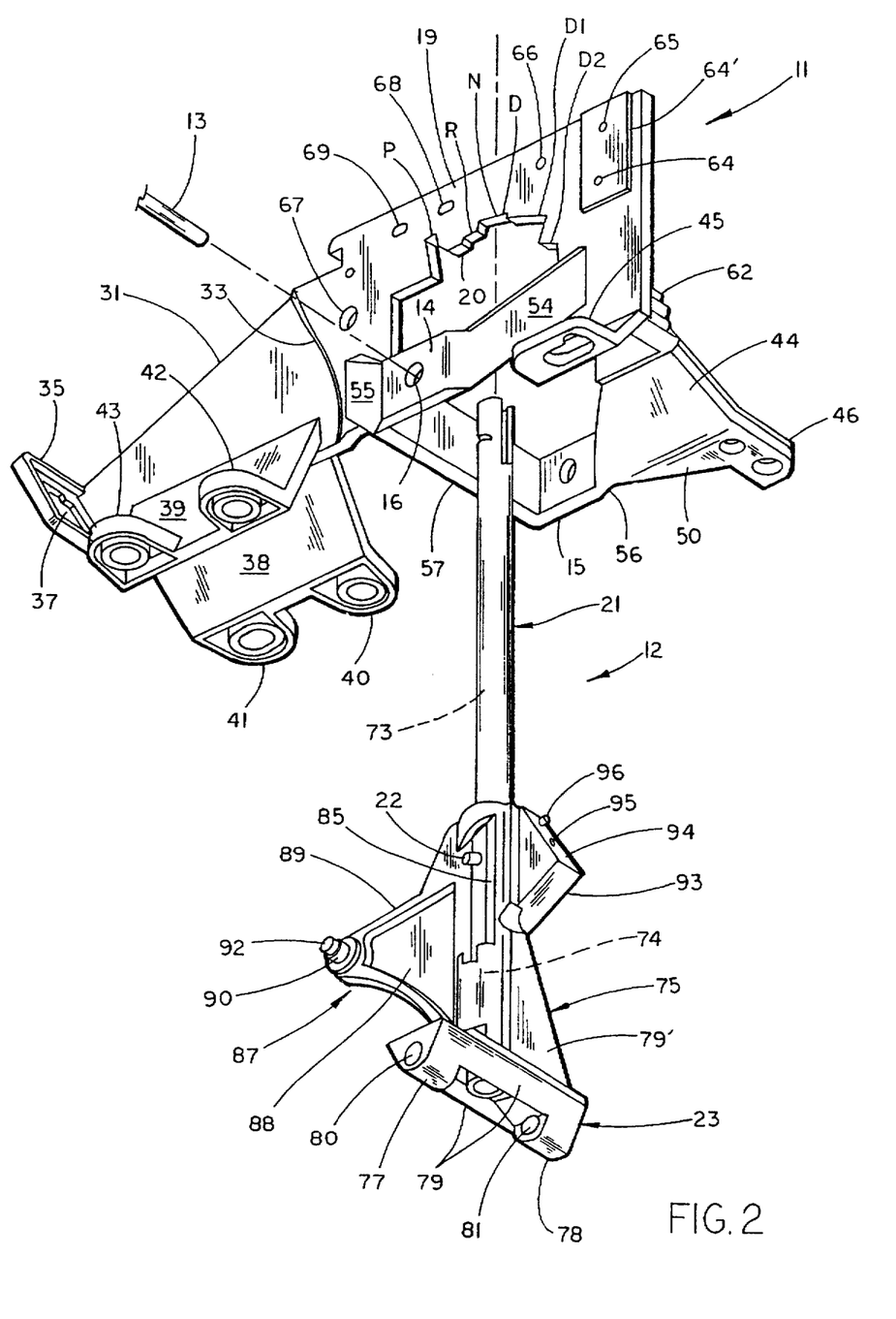
FIG. 2 is an exploded bottom perspective view of the shifter shown in FIG. 1.

An automatic transmission shifter 10 (FIG. 1) embodying the present invention includes a molded support 11 and a shift lever 12 pivotally mounted to the support 11 by a pivot pin 13. Support 11 includes a pair of opposing flanges pivot flanges or pivots 14 and 15 with aligned holes 16 for receiving pivot pin 13 to form an axis of rotation 18 for the shift lever 12. Support 11 further includes a detent plate structure 19 arching over axis 18 having notches 20 on an underside thereof defining gear positions such as park "P," reverse "R," neutral "N," drive "D" and other forward gear positions "D1" and "D2" (FIG. 2). Shift lever 12 includes a post 21 with a manually operable pawl 22 therein for engaging notches 20 and an insert-molded pivot structure 23 at the lower end of post 21. The bottom of the support 11 is open such that the shift lever 12 can be extended through the bottom of support 11 during assembly of lever 12 to support 11 to facilitate assembly. As shift lever 12 is extended through the bottom of support 11, post 21 is guided to a position adjacent detent plate 20 with pivot structure 23 being located between pivots 14 and 15. The bottom access allows ready alignment of pivot structure 23 with pivots 14 and 15 to facilitate easy and efficient insertion of pivot pin 13. Further, the support 11 is constructed to minimize weight while providing a rigidifying matrix of ribs for stably supporting shift lever 12 in a vehicle.

Figure 6:
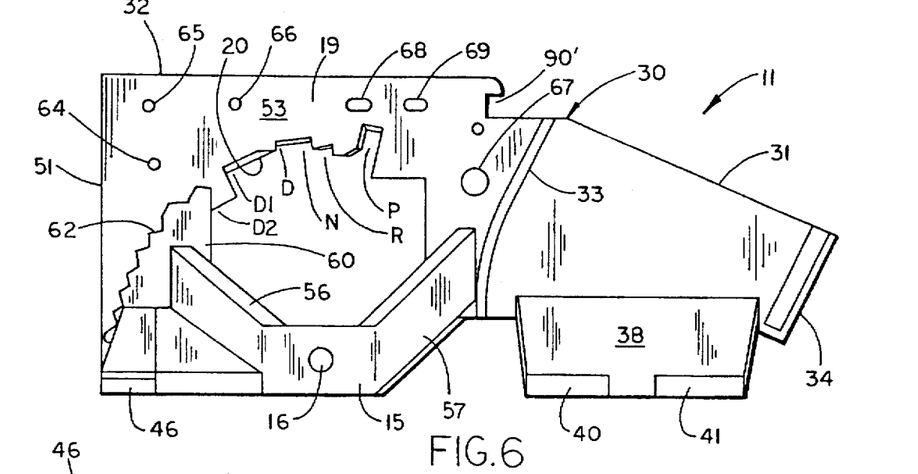
FIG. 6 is a side view of the support shown in FIG. 1.
Figure 7:
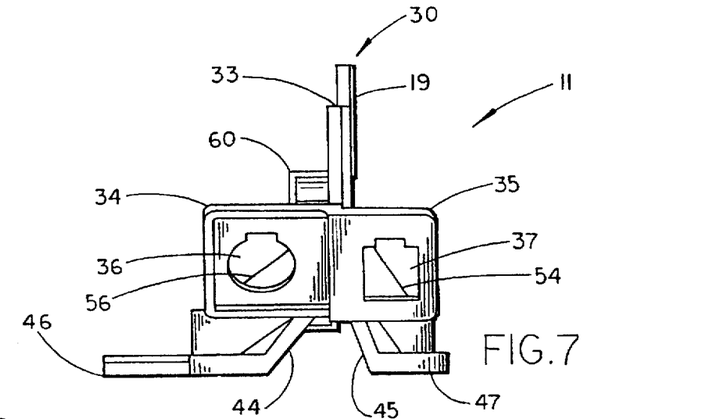
FIG. 7 is an end view of the support shown in FIG. 6.

Support 11 (FIG. 6) includes a longitudinal extending center flange 30 having a front section 31 and a rear section 32. Detent plate structure 19 is molded as part of rear section 32, although it is contemplated to be within the scope of the present invention to attach a metal detent plate to a side of rear section 32, or to insert mold a metal plate as part of center flange 30. Front and rear sections 31 and 32 are offset at an intermediate location along center flange 30 to form a stiffening rib 33. This also positions shift lever 12 at a desired location spaced from the vehicle longitudinal centerline. A pair of flanges 34 and 35 (FIG. 8) extend laterally from the front edge of front section 31. A configured aperture 36 is formed in flange 34 and forms a connector for receiving a cable sheath (not specifically shown) for connection to a transmission shift control cable. Such transmission shift control cables are generally known in the art and need not be disclosed herein for a complete understanding of the present invention. A configured aperture 37 is also formed in flange 35 and forms a connector for receiving a cable sheath (not shown) for connection to an ignition key interlock cable. Such ignition key interlock cables are also known in the art and need not be disclosed herein for a complete understanding of the present invention. Configured apertures 36 and 37 are shaped differently to prevent accidental reversal of the cables during installation, however the configured apertures include keys 36' and 37', respectively, to prevent rotation of the cable sheath when inserted in apertures 36 and 37.

A pair of angled legs 38 and 39 (FIG. 8) extend from the bottom edge of front section 31. Attachment flanges or feet 40 and 41 extend laterally from the bottom of leg 38 and attachment flanges 42 and 43 extend from the bottom of leg 39. Flanges 40, 41, 42 and 43 include holes or apertures for receiving screws to secure support 11 to a vehicle. A second pair of angled legs 44 and 45 extend from the bottom edge of the rear of rear section 32. Attachment flanges 46 and 47 extend in opposing directions from legs 44 and 45, respectively. Holes 48 and 49 are located in flanges 46 and 47 to receive screws for securing the rear of support 11 to the vehicle. Reinforcing ribs 50 are included on legs 38, 39, 44 and 45 as needed to rigidify the legs and stabilize the attachment flanges 40–43 and 46–47. The illustrated flanges 40–43 and 46–47 lie in a common plane, however nonplanar arrangements are also contemplated to be within the scope of the present invention.

Rear section 32 (FIG. 6) is longitudinally, vertically planar and has a generally inverted U-shaped configuration including rear vertical leg 51, second vertical leg 52 and horizontal leg 53 connecting vertical legs 51 and 52. The bottom of horizontal leg 53 includes the notches 20 and defines detent plate structure 19. Angled webs 54 and 55 (FIG. 8) extend from legs 51 and 52 to support pivot 14 on one side of center flange 30, and angled webs 56 and 57 extend from legs 51 and 52 on the opposing side of center flange 30 to support pivot 15. Webs 54, 55, 56 and 57 along with pivots 14 and 15 define a looped structure defining a downwardly facing access opening to the space between pivots 14 and 15. The inner surfaces 58 and 59 on pivots 14 and 15 are flat and spaced apart a predetermined distance for mateably receiving the insert-molded pivot structure 23 as discussed below. Aligned holes 16 are located in pivots 14 and 15, and are generally centered on inner surfaces 58 and 59. Webs 54, 55, 56 and 57 position pivots 14 and 15 at a predetermined distance below notches 20 so that pawl 22 operably engages notches 20 as the shift lever 12 is pivoted between gear positions on support 11. It is noted that angled webs 54 and 56 are angled downwardly and forwardly, and that angled webs 55 and 57 are angled downwardly and rearwardly, such that shift lever 12 is further stabilized structurally in relation to notches 20 and to the forces applied by a person's hand on a handle member 71 (FIG. 1) positioned at the top of post 21.

A feel positioner structure 60 (FIG. 1) is formed on a side of rear vertical leg 51. Feel positioner structure 60 includes an undulated or multi-facetted upper surface 62 for receiving a feel positioner roller attached to shift lever 12. The undulations 62 are designed to provide a comfortable feel to an operator when shifting shift lever 12 between the plurality of gear shift positions.

Additional mounting structure such as various holes 64–66 and 68–69 (FIG. 6) are molded into center flange 30 of support 11 as part of the molding process for manufacturing support 11. Protrusion 67 is insert-molded into support 11, and a conductive mounting plate 64' is attached to support 11. Notably, support 11 can be manufactured from various structural polymer materials, such as glass reinforced nylon or the like. It is also contemplated to be within the scope of the present invention to construct support 11 from sheet metal or other materials.

Figure 3:
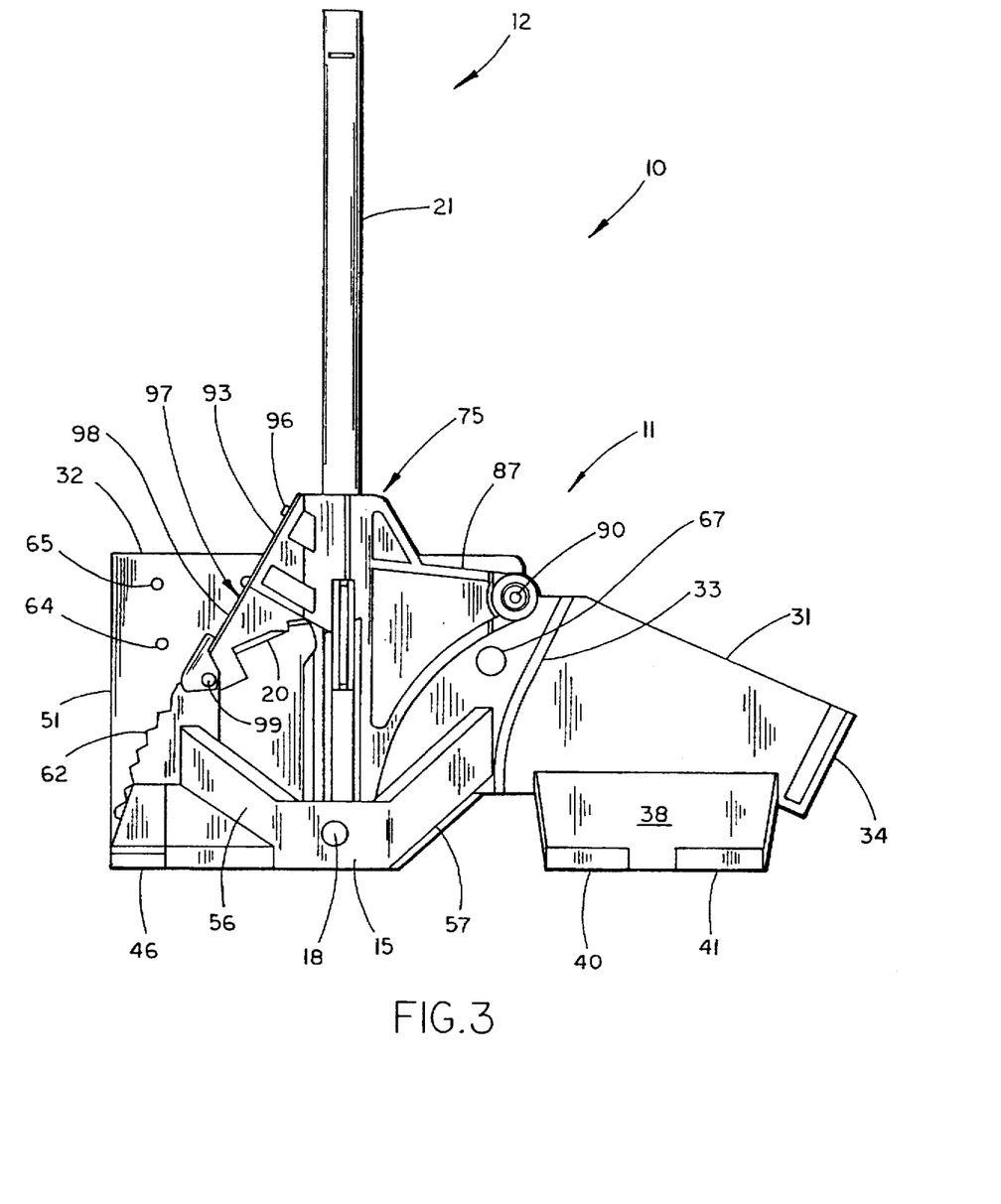
FIG. 3 is a side view of the shifter shown in FIG. 1.
Figure 3A:
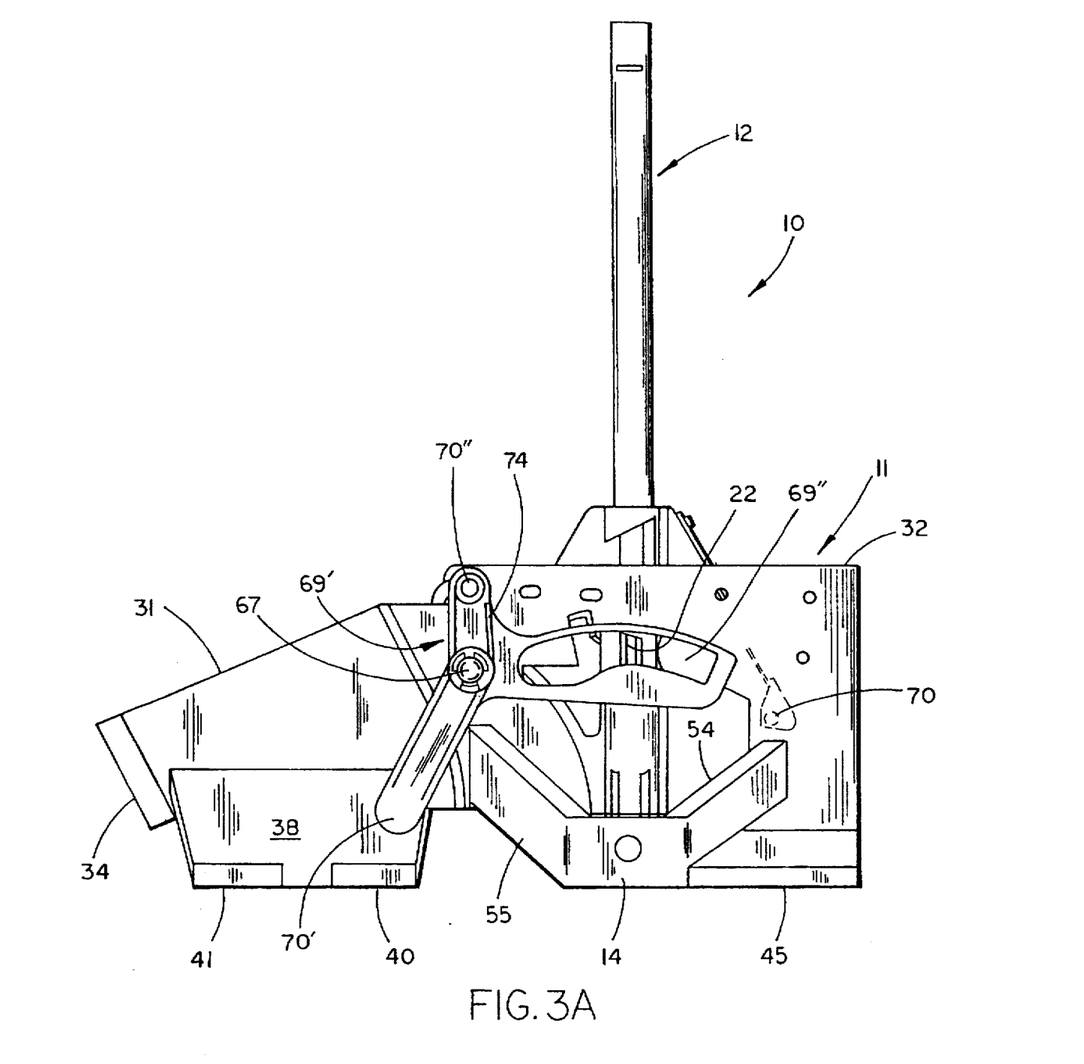
FIG. 3A is an opposite side view of the shifter shown in FIG. 1.
Figure 4:
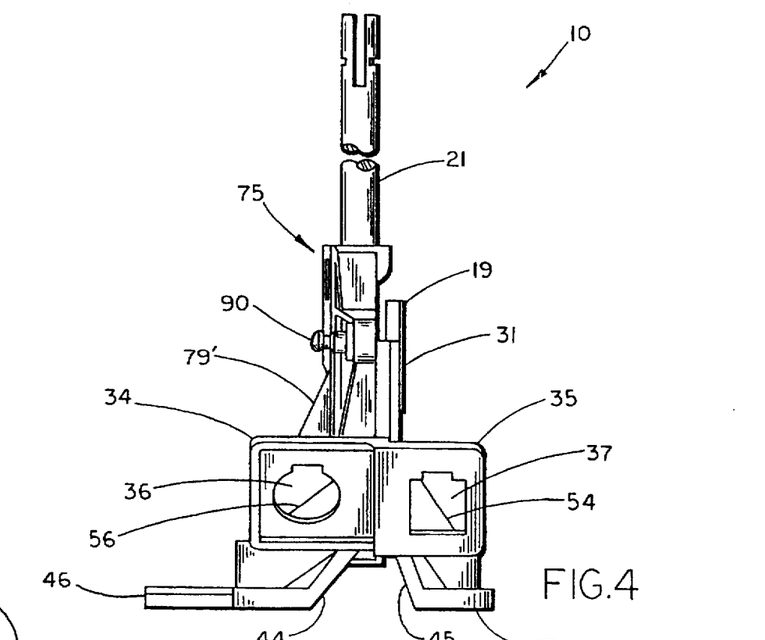
FIG. 4 is a front end view of the shifter shown in FIG. 3.
Figure 5:
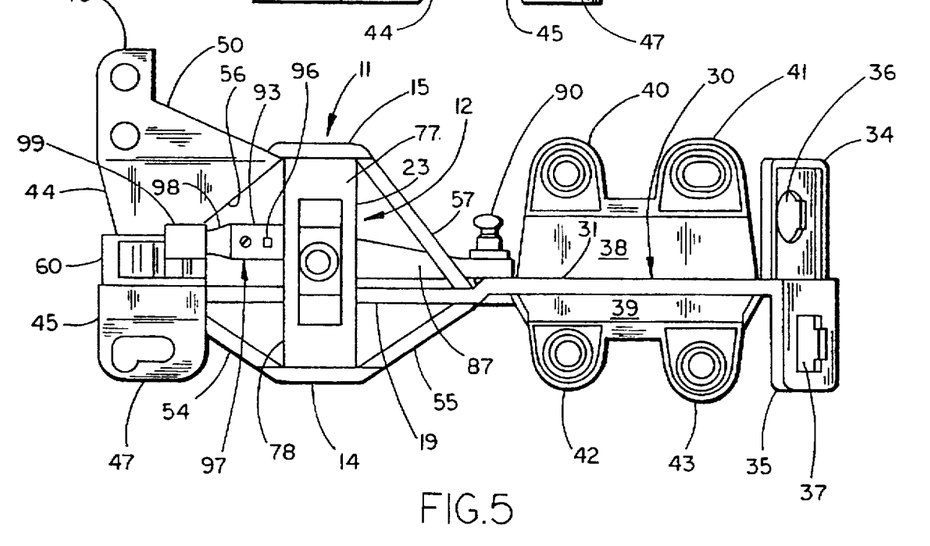
FIG. 5 is a bottom view of the shifter shown in FIG. 1.

Structures 64–69 provide attachment of various items to support 11, such as for attachment of subassemblies relating to shifter function, such as a gear indicator, a bezel assembly, and the like. A park lock arm 69' (FIG. 3A) is pivotally mounted on protrusion 67, and a solenoid for use on a brake-ignition-transmission-shift interlock (BITSI) system is attached to one leg of the park lock arm 69'. A park lock cable is attached to the other end 70' of park lock arm 69', and a helical torsion spring 74 is mounted on pin 67. A slot 69" in park lock arm 69' receives pawl 22. Spring 74 biases park lock arm 69' rotationally such that pawl 22 is continuously biased upwardly against gear notches 20. BITSI systems are generally known in the art and need not be described in detail herein. Generally described, one end of the BITSI solenoid is attached to the park lock arm 69' and the other end of the solenoid is connected to location 70 (FIG. 3A). If the BITSI solenoid is energized, the park lock arm 69' is locked and the pawl 22 cannot be moved downward out of park position "P." Conversely, if the shift lever 12 is in any other gear position, the park lock arm 69' prevents an ignition key from being removed from the ignition of a vehicle by its interaction with the park lock cable at a location 70" on park lock arm 69'.

Shift lever 12 (FIG. 1) includes a handle member 71 mounted on top of post 21. The illustrated post 21 comprises a steel tube, however materials other than steel, and also shapes other than tubular are contemplated to be within the scope of the present invention. A thumb actuation bottom 72 is operably mounted in handle member 71 and operably connected to a straw 73 that extends vertically within post 21. Pawl 22 (FIG. 2) extends laterally from a lower end of straw 73 and is rectangularly-shaped.

Figure 8:
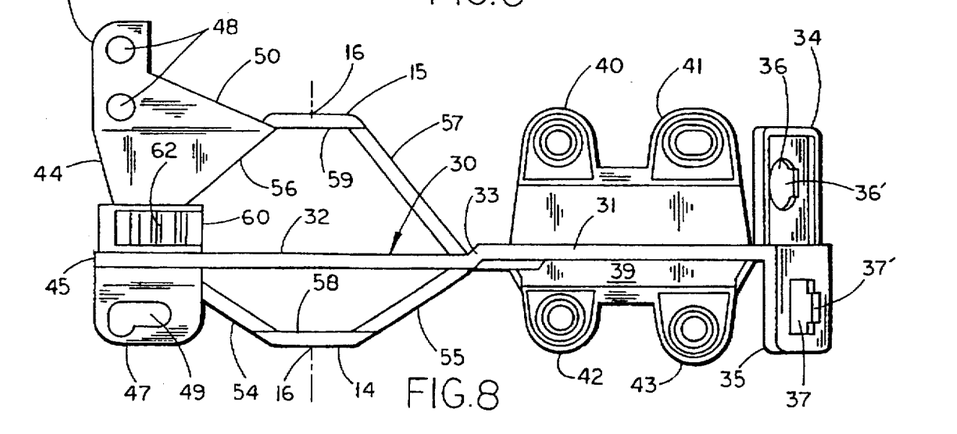
FIG. 8 is a bottom view of the support shown in FIG. 6.
Figures 9, 10, 11:
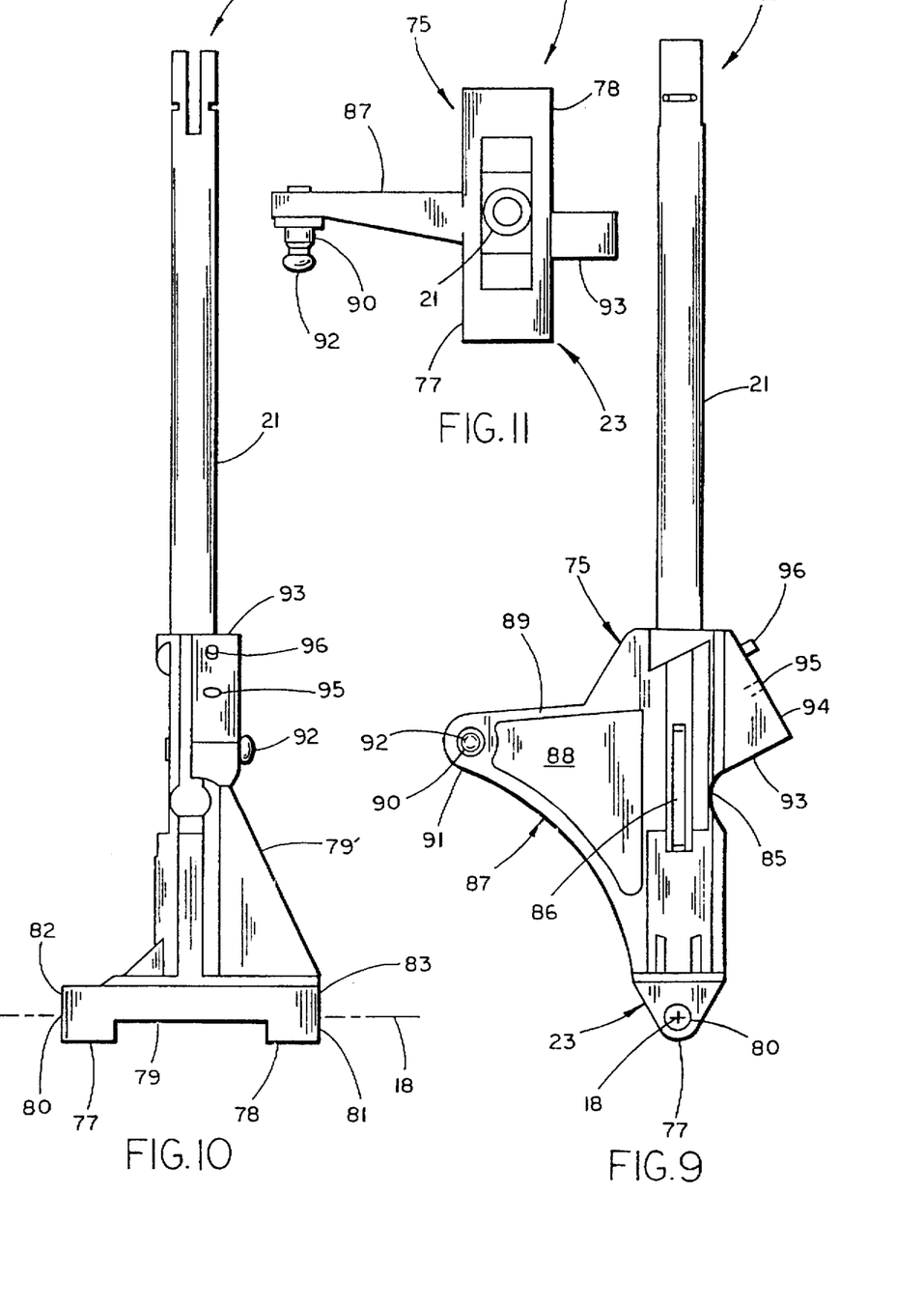
FIG. 9 is a side view of the shift lever shown in FIG. 1.
FIG. 10 is an end view of the shift lever shown in FIG. 9.
FIG. 11 is a bottom view of the shift lever shown in FIG. 9.

An insert-molded body 75 (FIGS. 9–11) is molded to the lower end of steel tubular post 21. Insert-molded body 75 includes pivot structure 23 which extends transversely at the lower end of body 75. Pivot structure 23 (FIG. 10) includes spaced apart lobes 77 and 78 interconnected by a transverse web 79. A vertical reinforcement rib 79' supports pivot structure 23 perpendicularly to body 75 and post 21. Lobes 77 and 78 include aligned holes 80 and 81. The outer surfaces 82 and 83 on the exterior of lobes 77 and 78 are generally planar and parallel and define a dimension configured to mateably fit within inner surfaces 58 and 59 on pivots 14 and 15 (FIG. 8). A vertically extending section 85 (FIG. 9) of body 75 generally surrounds the lower end of post 21. A slot 86 extends along the side of vertical section 85 for receiving pawl 22 and for allowing pawl 22 to laterally extend from post 21. A triangularly-shaped planar section 87 (FIG. 9) extends forwardly from vertical section 85. Section 87 includes a generally triangularly-shaped web of material 88 and a rib 89 extending around the perimeter of web 88 to stiffen same. A universal cable connector 90 is connected to a tip 91 of planar section 87 and extends transversely. Cable connector 90 has a configured end 92 for snap attachment to a transmission control cable (not specifically shown). Transmission control cables are generally known in the art and need not be disclosed herein for a complete understanding of the present invention.

A feel positioner mounting structure 93 (FIG. 9) extends rearwardly from vertical section 85. Mounting structure 93 defines a planar surface 94 including a hole 95 and a locating tab 96. Planar surface 94 extends generally tangentially toward undulated surface 62 (FIG. 1). A feel positioner 97 (FIG. 1) is shaped to be supported on mounting structure 93 with its free end being in operable engagement with the feel positioner surface 62 on support 11. Feel positioner 97 includes a leaf spring strap 98 with holes corresponding to hole 95 and tab 96 to permit screw attachment of strap 98 to mounting structure 93. A roller 99 is rotatably supported on the free end of strap 98.

Shifter 10 is assembled by extending shifter 12 into the bottom of support 11 (FIG. 2). Once shift lever 12 is moved into position (FIG. 1), post 21 is located beside detent plate 19, pawl is engaged with notches 20, and pivot structure 23 is located between pivots 14 and 15 on support 11. Pivot structure 23 is aligned with pivots 14 and 15, and pivot pin 13 is extended through pivots 14 and 15 and through pivot structure 23. Notably, it is contemplated that a pair of pivot pins could be used instead of the single pivot pin 13. Pivot pin 13 is press fit into position or flanged at its end to prevent removal. The feel positioner 97 is then secured to shifter 10 along with BITSI solenoid 70 and any other components to be secured to support 11. Handle member 71 can be preassembled to shift lever 12 before assembly to support 11 or after assembly to support 11. Where handle member 71 is preassembled to shift 12, clearance is provided between pivots 14 and 15 and around the webs 54-57 supporting pivots 14 and 15 so that handle member 71 can be moved therebetween during assembly.

Thus, a shifter is provided that includes a support having a generally open bottom area, and a shift lever configured to be mounted in the support through the bottom area to facilitate assembly. In the foregoing description, it will be readily appreciated by those skilled in the art that modifications may be made to the invention without departing from the concepts disclosed herein. Such modifications are to be considered as covered by the following claims, unless these claims by their language expressly state otherwise.

The embodiments of the invention in which an exclusive property or privilege is claimed are defined as follows:

1. An automatic transmission shifter for a vehicle comprising:

a support configured for attachment to a vehicle, said support including a longitudinally extending center flange forming a detent plate structure defining a plurality of gear positions and further including spaced apart opposing pivot flanges and webs connecting opposite ends of each of said pivot flanges to said center flange in spaced relationship therefrom, said pivot flanges defining a space therebetween generally below said detent plate structure and defining a downwardly-facing access opening and an upwardly facing access opening to said space;

a shift lever for shifting between the plurality of gear shift positions on said support, said shift lever including a post and a pivot structure at one end of the post, the shift lever being configured to fit through said downwardly facing access opening of said support during assembly to an operative position wherein said post is positioned adjacent said detent plate structure and said pivot structure is positioned between said opposing pivot flanges; and at least one pivot pin engaging said pivot structure and said opposing pivot flanges for pivotally mounting said shift lever to said support, upper edges of said pivot flanges terminating below an upper edge of said center flange to provide an open, accessible structure whereby manual manipulation and positioning of said pivot structure on said pivot flanges is facilitated thereby simplifying assembly of said shifter.

2. An automatic transmission shifter as defined in claim 1 wherein said pivot structure is insert-molded on said post.

3. An automatic transmission shifter as defined in claim 1 wherein said support comprises a molded structural polymer.

4. An automatic transmission shifter as defined in claim 3 wherein said detent plate structure is molded as an integral part of said support.

5. An automatic transmission shifter for a vehicle, comprising:

a support configured for attachment to a vehicle, said support including a longitudinally extending center flange, the center flange including a detent plate structure defining a plurality of gear positions, spaced apart opposing pivot flanges and webs connecting opposite ends of each of said pivot flanges to the center flange in spaced relationship therefrom, at least one leg projecting laterally from each side of the center flange, each laterally projecting leg including an attachment flange defining an aperture for receiving a fastener for securing the support to a vehicle;

a shift lever including pivot structure; and at least one pivot pin engaging the pivot structure and the opposing pivot flanges for pivotally mounting the shift lever to the support.

6. The automatic transmission shifter of claim 5, wherein the longitudinally extending center flange includes a front section and a rear section, the front and rear sections being off-set at an intermediate location along the center flange to form a stiffening rib.

7. The automatic transmission shifter of claim 6 including a first pair of legs projecting laterally from each side of the front section of the center flange, and a second pair of legs projecting laterally from each side of the rear section of the center flange.

8. The automatic transmission shifter of claim 5, wherein the laterally projecting legs extend downwardly and away from the center flange.

9. The automatic transmission shifter of claim 5, wherein the detent plate is molded as part of the center flange.

10. The automatic transmission shifter of claim 5, wherein the detent plate is a metal plate attached to the center flange.

11. The automatic shifter of claim 11, wherein the detent plate is a metal plate which is insert molded as a part of the center flange.

12. The automatic transmission shifter of claim 5, wherein the laterally projecting legs extend from a lower edge of the center flange, and the attachment flanges extend from a lower edge of the legs.

13. An automatic transmission shifter for a vehicle, comprising:

a support configured for attachment to a vehicle, the support including a longitudinally extending center flange including a detent plate structure defining a plurality of gear positions, spaced apart opposing, pivot flanges, a leg projecting laterally from each side of the center flange, each laterally projecting leg including an attachment flange defining an aperture for receiving a fastener for securing the support to a vehicle, each of the legs extending directly from the center flange and downwardly away from the center flange at an angle therefrom;

a shift lever including pivot structure; and at least one pivot pin engaging the pivot structure and the opposing pivot flanges for pivotally mounting the shift lever to the support.

14. The automatic transmission shifter of claim 13, wherein the detent plate is molded as part of the center flange.

15. The automatic transmission shifter of claim 13, wherein the detent plate is a metal plate attached to the center flange.

16. The automatic shifter of claim 13, wherein the detent plate is a metal plate which is insert molded as a part of the center flange.

17. The automatic transmission shifter of claim 13, wherein the laterally projecting legs extend from a lower edge of the center flange, and the attachment flanges extend from a lower edge of the legs.

18. An automatic transmission shifter for a vehicle, comprising:

a support configured for attachment to a vehicle, the support including a longitudinally extending center flange including a detent plate structure defining a plurality of gear positions, spaced apart opposing pivot flanges, a leg projecting laterally from each side of the center flange, each laterally projecting leg including an attachment flange defining an aperture for receiving a fastener for securing the support to a vehicle, each of the legs extending downwardly and away from the center flange at an angle therefrom;

a shift lever including pivot structure;

at least one pivot pin engaging the pivot structure and the opposing pivot flanges for pivotally mounting the shift lever to the support; and the longitudinally extending center flange including a front section and a rear section, the front and rear sections being off-set at an intermediate location along the center flange to form a stiffening rib.

19. The automatic transmission shifter of claim 18 including a first pair of legs projecting laterally from each side of the front section of the cente flange, and a second pair of legs projecting laterally from each side of the rear section of the center flange.

\* \* \* \* \*

UNITED STATES PATENT AND TRADEMARK OFFICE
CERTIFICATE OF CORRECTION

PATENT NO. : 5,799,538
DATED : September 1, 1998
INVENTOR(S) : Richard A. DeJonge and Richard G. Holtzclaw It is certified that error appears in the above-identified patent and that said Letters Patent is hereby corrected as shown below:

Column 6, claim 11, line 38;
"claim 11" should be --claim 5--.

Signed and Sealed this

Fifteenth Day of December, 1998

*Attest:*

BRUCE LEHMAN

*Attesting Officer*   Commissioner of Patents and Trademarks